United States Patent [19]

Goeserich

[11] Patent Number: 4,993,133
[45] Date of Patent: Feb. 19, 1991

[54] INTERFERENCE FIT ROLLER WITH LIQUID SEAL

[75] Inventor: Manfred H. Goeserich, Churchville, N.Y.

[73] Assignee: Eastman Kodak Company, Rochester, N.Y.

[21] Appl. No.: 501,566

[22] Filed: Mar. 30, 1990

[51] Int. Cl.$^5$ ............................................. B21B 31/08
[52] U.S. Cl. ...................................... 29/129.5; 29/132
[58] Field of Search ............... 29/121.1, 121.4, 121.6, 29/121.7, 129.5, 132, 123; 101/348, 375; 354/319, 320, 321, 322

[56] References Cited

U.S. PATENT DOCUMENTS

| | | | |
|---|---|---|---|
| 199,712 | 1/1878 | Horrocks et al. | 193/37 |
| 285,011 | 10/1883 | Cambell | 29/130 |
| 294,436 | 3/1884 | Bingham | 29/119 |
| 387,647 | 8/1888 | Lang | 29/131 |
| 527,107 | 10/1894 | Cain | 29/130 |
| 710,327 | 9/1902 | Kling | 29/113.1 |
| 1,386,427 | 8/1921 | Runge | 29/130 |
| 1,404,209 | 1/1922 | Linder | 29/121.8 |
| 1,414,449 | 5/1922 | Witzig | 29/122 |
| 1,576,726 | 3/1926 | Davis | 29/121.4 |
| 1,594,356 | 8/1926 | Davis | 428/375 |
| 1,669,942 | 5/1928 | Linder | 29/119 |
| 2,329,796 | 9/1943 | Stoffer | 29/129.5 |
| 2,741,014 | 4/1956 | Hubbard | 29/130 |
| 2,925,088 | 2/1960 | Roscoe | 68/212 |
| 3,022,573 | 2/1962 | Bullock | 29/235 |
| 3,435,500 | 4/1969 | Aser et al. | 29/130 |
| 3,447,221 | 6/1969 | Odiorne | 29/121.1 |
| 3,451,112 | 6/1969 | Karmell et al. | 29/130 |
| 3,520,747 | 7/1970 | McGaughey | 156/153 |
| 3,640,218 | 2/1972 | Allison | 101/375 |
| 3,686,731 | 8/1972 | Koori et al. | 29/132 |
| 3,722,050 | 3/1973 | Samuels | 29/129.5 |
| 3,760,616 | 9/1973 | Hyosaka | 101/348 |
| 3,941,635 | 3/1976 | Travelle et al. | 156/86 |
| 3,971,115 | 7/1976 | Schneider et al. | 29/895.32 |
| 4,050,886 | 9/1977 | Moser | 432/60 |
| 4,098,631 | 7/1978 | Stryjewski | 156/221 |
| 4,313,981 | 2/1982 | Namiki | 427/409 |
| 4,789,565 | 12/1988 | Kon et al. | 427/375 |

Primary Examiner—P. W. Echols
Assistant Examiner—David P. Bryant
Attorney, Agent, or Firm—Thomas H. Close

[57] ABSTRACT

An interference fit elastomer covered roller including a shaft and an elastomeric tube covering the shaft, for use in contact with fluids includes fluid seals at the ends of the shaft comprising a topographical feature on the shaft defining at least one circumferential edge at a change in radius of hte shaft, effective for concentrating stress in the elastomeric tube around the edge to provide liquid sealing action.

9 Claims, 5 Drawing Sheets

INTERFERENCE FIT ROLLER WITH LIQUID SEAL

TECHNICAL FIELD OF THE INVENTION

The present invention relates to elastomer covered rollers and more particularly, to such rollers employed in contact with liquids such as in photographic processing apparatus.

BACKGROUND OF THE INVENTION

In photographic processing apparatus, elastomer covered rollers are employed to transport film and photographic paper through tanks of processing solutions. Presently, these rollers are manufactured by transfer molding a thermosetting elastomeric compound on a shaft such as stainless steel. The shaft is prepared by roughing the surface, for example by sand blasting, and applying a solvent based primer adhesive to the surface of the shaft. After air drying for approximately 30 minutes, a main solvent based adhesive is applied to the shaft and air dried for approximately 30 more minutes. The shaft is then placed in a thermal compression mold, surrounded by uncured elastomer, and baked for example at 350° for 30-40 minutes to cure (vulcanize) the elastomer and adhesive system. After cooling, the elastomer covered roller is removed from the mold, and ground to finish tolerance. This many step process is labor intensive and time consuming (and hence expensive) and employs environmentally undesirable solvent based adhesives.

In addition, when the elastomeric surface of such a roller experiences wear or is damaged, the roller including the shaft is discarded.

An alternative method of manufacturing elastomeric covered rollers, called interference fit manufacturing employs a preformed tube of elastomeric material, having an inside diameter less than the diameter of the shaft. The tube is placed on the shaft by introducing compressed air into one end of the tube while the shaft is introduced into the other end. The compressed air expands the elastomeric tube sufficiently to enable the shaft to be introduced. When the compressed air is removed, the elastomeric tube tightly grips the shaft without the need for pretreating the shaft or applying any adhesives. Such rollers can be manufactured to finish tolerance without the need for finished grinding, and the time consuming steps of adhesive coating and elastomer vulcanizing are avoided. The interference fit roller manufacturing process takes seconds rather than hours. Additionally, when the elastomeric coating is damaged, it is easily removed from the shaft simply by slitting the elastomeric tube longitudinally and removing the shaft. The shaft can then be reused to make remanufactured rollers.

Unfortunately, the present inventor has discovered that when such interference fit rollers are employed in contact with photographic processing solution, due to the extreme wetting ability of the solution, some solution leaks between the roller and the shaft. This is undesirable since the trapped solutions can promote corrosion of the shaft and can be transported to a subsequent processing step where it pollutes the subsequent processing solution.

A first solution to this problem that was attempted was to pretreat the shaft with an adhesive. Although this approach solved the fluid leaking problem, it complicated the previously simple interference fit process and reintroduced the problem of environmentally undesirable solvent based adhesives.

SUMMARY OF THE INVENTION

It is therefore the object of the present invention to provide an elastomeric roller for use in contact with processing solutions that avoids the problems noted above.

The object is achieved according to the present invention by providing, in an interference fit roller, a compression seal at each end of the elastomeric tube, each compression seal comprising a topographical feature on the shaft defining at least one circumferential edge at a change in radius of the shaft effective for concentrating stress in the elastomeric tube around the edge to provide liquid sealing action. In a preferred embodiment, the compression seal is obtained by extending the elastomeric tube slightly past the ends of the shaft, and allowing the ends of the tube to contract around the edges of the ends of the shaft to form a liquid seal. It has been discovered by the present inventor that such a configuration provides an effective seal to keep processing solutions from leaking between the shaft and the elastomeric tube.

The same effect can be provided in a roller where only a portion of the shaft is covered by the elastomeric sleeve, by providing circumferential grooves or flanges in the shaft located such that the ends of the elastomeric tube relax into the groove or contact the edges of the flange.

Additional secondary compression seals can be provided adjacent the primary seal by providing one or more additional circumferential grooves or ridges in the shaft. Preferably, the diameter of the shaft at the bottom of the grooves providing the secondary compression seals are greater than the inside diameter of the relaxed elastomeric tube.

By providing such features according to the present invention, no additional fastening or adhesive bonding of the elastomeric tube to the shaft is required to obtain a leak proof seal.

MODES OF CARRYING OUT THE INVENTION

Figure 2:
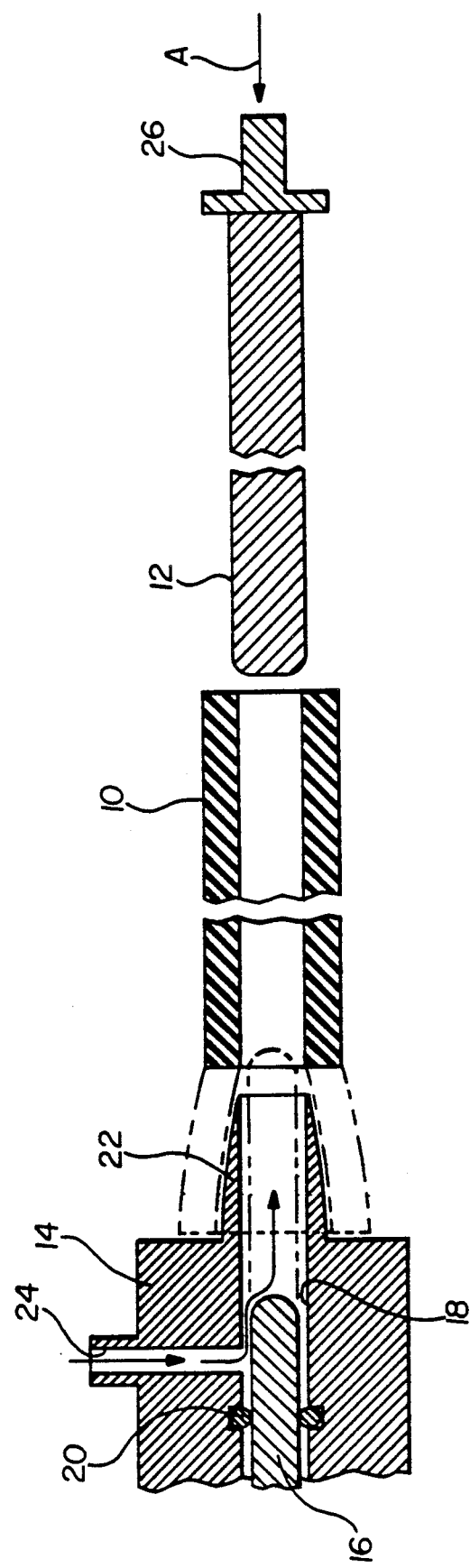
FIG. 2 is a schematic diagram showing prior art apparatus for assembling interference fit rollers.

Referring first to FIG. 2, the conventional method of assembly interference fit elastomeric covered rollers will be described. The roller is assembled from an elastomeric tube 10 and a cylindrical shaft 12. The elastomeric tube 10 may comprise any of the natural or manmade elastomeric polymers produced by any of the known methods for producing tubing such as extrusion, injection molding or transfer molding. The shaft 12 may comprise any of the conventional structural materials employed for making roller shafts such as stainless steel, plated steel (plastic or composites). The elastomeric tube 10 has an inside diameter approximately 10 to 40% less than the outside diameter of the shaft 12. The elastomeric tube 10 and shaft 12 are placed in a supporting fixture (not shown), and an air chuck 14 is urged against one end of the elastomeric tube 10. The air chuck includes a pilot pin 16 that fits loosely inside an air passage 18, and is sealed with an o-ring 20. The air passage 18 has an inside diameter slightly larger than the diameter of the shaft 12. The diameter of the end of pilot pin 16 is slightly less than the inside diameter of the elastomeric tube 10. When the air chuck first engages the elastomeric tube, the pilot pin 16 is extended as shown by dashed lines in FIG. 2 to guide the elastomeric tube 10 onto a nozzle 22 of the air chuck. Compressed air is introduced into passage 18 through an inlet 24. As compressed air is introduced into the elastomeric tube 10 through nozzle 22, the shaft 12 is urged by a piston 26 in the direction of arrow A against the other end of the elastomeric tube, thereby sealing the tube and forcing the tube onto nozzle 22. At this point, pilot pin 16 is withdrawn to the position shown by solid lines in FIG. 2 to act as a stop for the shaft 12.

In response to the air pressure inside tube 10, the tube expands to accept the shaft 12, and shaft 12 is readily driven into position inside the elastomeric tube 10.

At this point, the air pressure is removed and the assembled roller is withdrawn from the air chuck 14.

Figure 1:
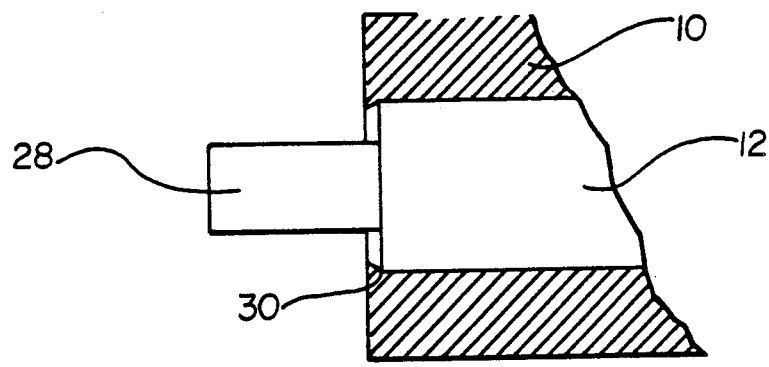
FIG. 1 is a partial cross sectional view of an interference fit elastomer covered roller having a compression seal according to the present invention.

Turning now to FIG. 1, a liquid seal according to the present invention will be described. FIG. 1 shows a cross section of one end of a roller of the type having a reduced diameter axle 28 on shaft 12. An effective liquid seal is formed by allowing the elastomer tube 10 to extend slightly past the ends of the shaft 12, and to contract around the peripheral edge of the shaft to form a liquid seal 30. To achieve an effective liquid seal, the diameter of axle 28 is preferably less than the inside diameter of the elastomeric tube 10 in its relaxed state. The sealing action is achieved by a concentration of stress in the elastomeric tube around the edge of the shaft, due to the contraction of the elastomeric material over the end, and the finite beam strength of elastomeric tube.

Figure 3:
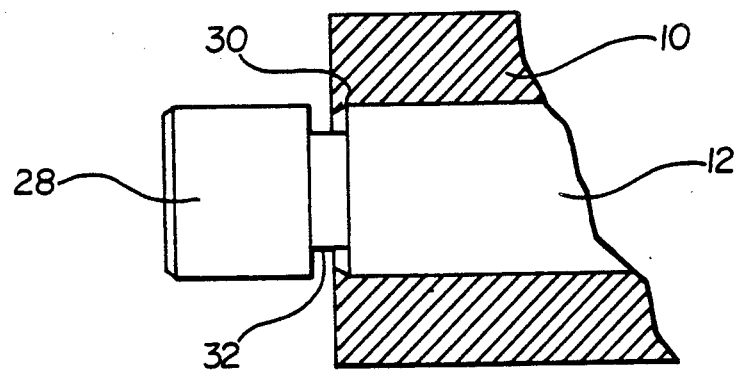
FIG. 3 is a partial cross sectional view of an interference fit elastomeric covered roller with an alternative configuration for a compression seal according to the present invention.

FIG. 3 shows an alternative configuration for the seal 30, when the roller axle 28 is the same diameter as the shaft 12. A circumferential groove 32 is provided in the shaft 12. The diameter of the shaft at the bottom of the groove 32 is preferably less than the inside diameter of the relaxed elastomeric tube 10. The groove is sufficiently wide to allow the end of the elastomeric tube 10 to relax into the groove without interference, to thereby establish the primary liquid seal 30.

Figure 4:
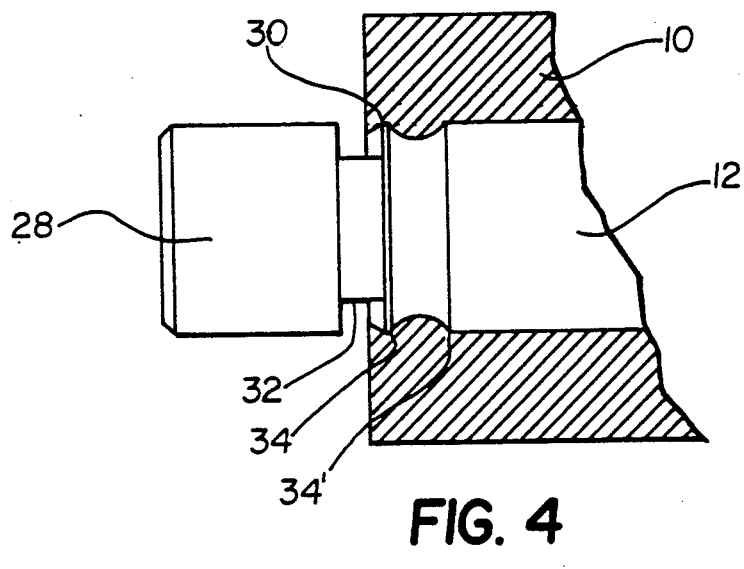
FIG. 4 is a partial cross sectional view of an interference fit elastomeric covered roller having primary and secondary compression seals according to the present invention.
Figure 5:
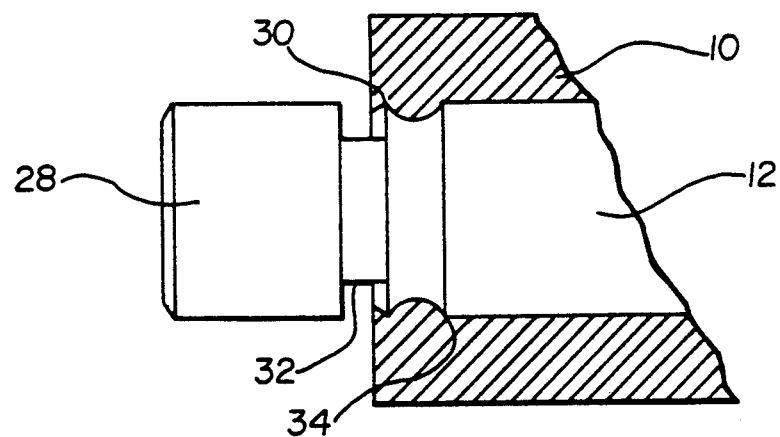
FIGS. 5-12 are partial cross sectional views of interference fit elastomeric covered rollers having a primary and secondary compression seals according to the present invention.

Although the primary seal 30 is generally sufficient to prevent the leakage of fluid between the elastomeric tube 10 and the shaft 12, additional secondary sealing action may be provided by allowing the elastomeric tubing to contract into and around various circumferential grooves and flanges at the end of the roller adjacent the primary seal. Preferably, the diameter of the shaft 12 at the bottom of the additional circumferential grooves is greater than the inside diameter of the relaxed elastomeric tube 10. FIG. 4 shows an example of secondary seals 34 and 34' provided at the edges of a round bottom circumferential groove adjacent the end of the shaft 12. FIG. 5 shows an alternative for providing a single secondary seal 34, where the round bottom groove is immediately adjacent the end of the shaft 12.

Figure 6:
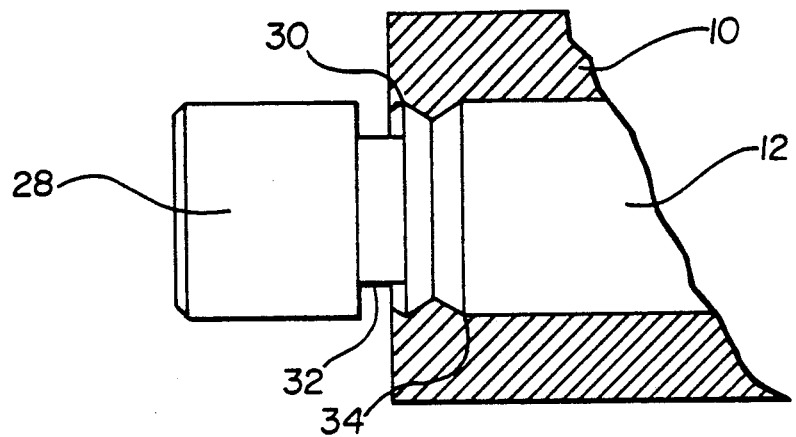
Figure 7:
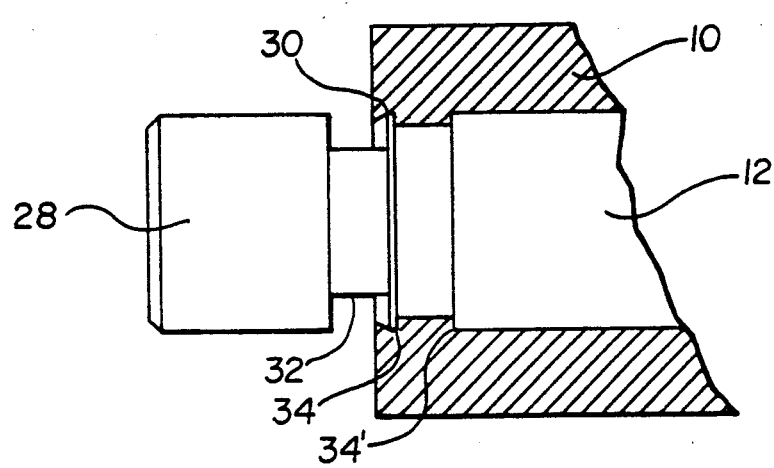
Figure 8:
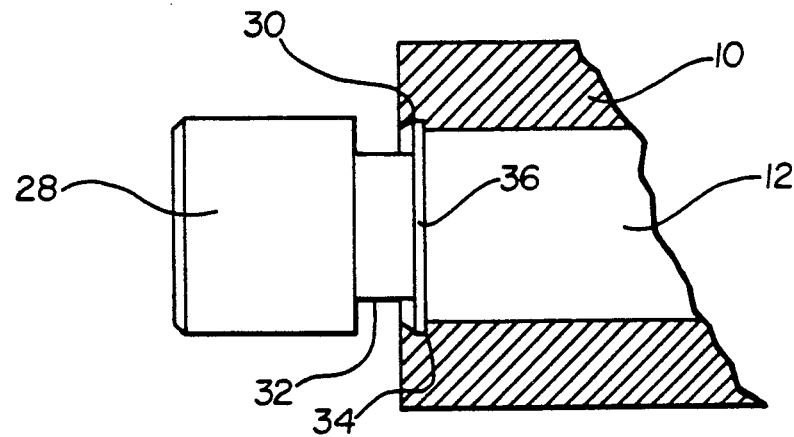
Figure 9:
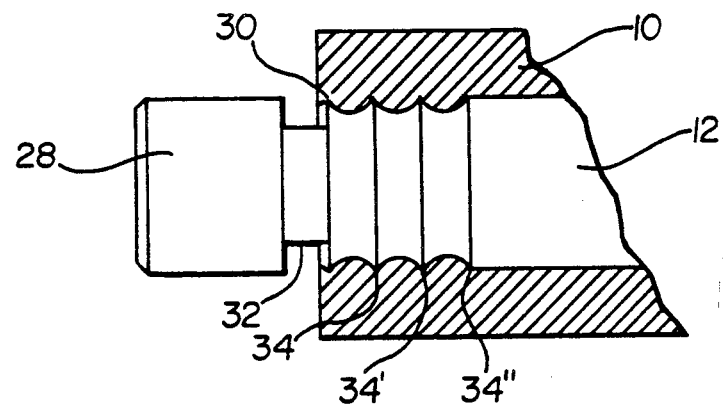
Figure 10:
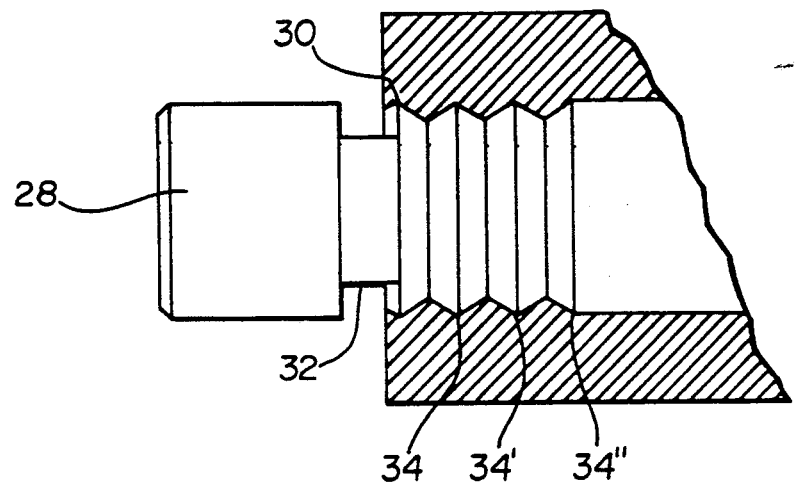

FIG. 6 shows a still further example of a secondary seal 34 provided at the edge of a circumferential v-groove immediately adjacent the primary seal 30. FIG. 7 shows an example of secondary seals 34 and 34' provided at the edges of a flat bottomed groove adjacent the primary seal 30. FIG. 8 shows an example, where the primary seal 30 and a secondary seal 34 are provided by a flange 36. A plurality of secondary seals 34, 34', and 34" can be provided as shown in FIGS. 9 and 10.

Figure 11:
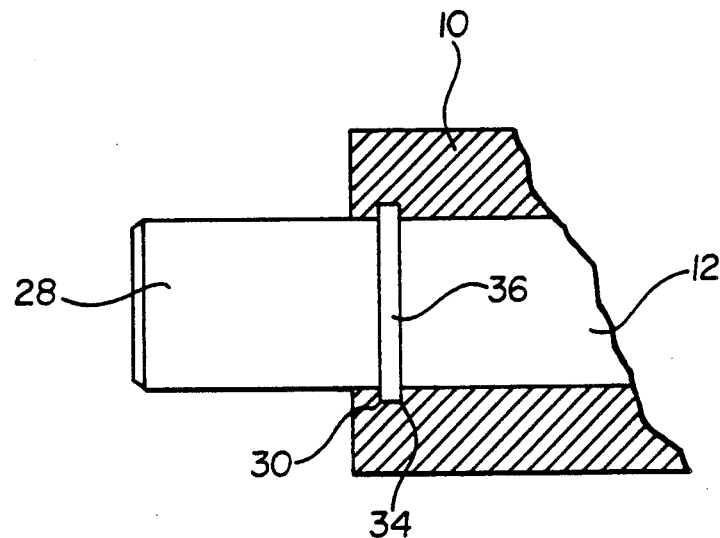
Figure 12:
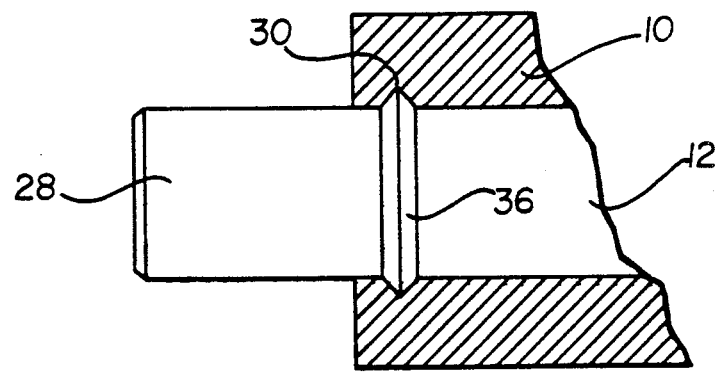

FIG. 11 shows an example where primary and secondary seals 30 and 34 are provided by a flat topped flange 36. FIG. 12 shows an example where a single primary seal 30 is provided by a v-shaped flange 36.

EXPERIMENTAL RESULTS

Comparative Example

An interference fit roller was prepared employing a 15 cm long length of extruded Santoprene ® thermoplastic rubber (Monsanto Chemical Co.) tubing having 15 mm outside diameter and 7 mm inside diameter. The rubber tubing was installed on a 20 cm long, 9 mm diameter stainless steel shaft employing the interference fit compressed air method described with reference to FIG. 2 above. No special surface treatment such as sandblasting or machining was provided on the shaft. The resulting roller was immersed in photographic processing solution for one month. After removing the roller from the solution, the elastomer was removed from the shaft by slitting longitudinally and the shaft was examined. Upon examination, stains on the shaft indicated that the processing solution had leaked between the shaft and the elastomer to a depth of approximately 2 cm along the shaft.

Working Example

An interference fit roller identical to that described above, with the inclusion of the primary and secondary seals as shown in FIG. 4 was prepared and tested as described above. When the elastomer was removed, there was no evidence of fluid leakage past the primary seal.

INDUSTRIAL APPLICABILITY AND ADVANTAGES

Elastomeric rollers according to the present invention are useful in transporting web and sheet material through processing solution baths, for example in photographic processing apparatus. The elastomeric rollers have the advantages that they are less expensive to manufacture, no solvent based adhesives are required, no heat step is required to cure the elastomer on the shaft, the rollers can be assembled in a few seconds rather than hours, no special preparation (such as sand blasting) is required on the shaft, and if the elastomeric material is damaged it is easily removed by slitting the material longitudinally and the shaft can be reused thereby resulting in further savings. Alternatively, the shaft can easily be removed in the pneumatic apparatus shown in FIG. 2 by reversing the assembly process.

I claim:

1. An interference fit elastomer covered roller for use in contact with fluids, comprising:
   a. a cylindrical shaft;

b. an elastomeric tube having an inside diameter smaller than the outside diameter of the cylindrical shaft when the tube is in a relaxed state, the elastomeric tube being stretched over the cylindrical shaft;

c. a compression seal at each end of the tube, each compression seal comprising a circumferential groove in the shaft defining at least one circumferential edge at a change in radius of the shaft effective for concentrating stress in the elastomeric tube around said edge to provide liquid sealing action.

2. An interference fit elastomer covered roller for use in contact with fluids, comprising:

a. a cylindrical shaft;

b. an elastomeric tube having an inside diameter smaller than the outside diameter of the cylindrical shaft when the tube is in a relaxed state, the elastomeric tube being stretched over the cylindrical shaft;

c. a compression seal at each end of the tube, each compression seal comprising a circumferential ridge on the shaft defining at least one circumferential edge at a change in radius of the shaft effective for concentrating stress in the elastomeric tube around said edge to provide liquid sealing action.

3. An interference fit elastomer covered roller for use in contact with fluids, comprising:

a. a cylindrical shaft;

b. an elastomeric tube having an inside diameter smaller than the outside diameter of the cylindrical shaft when the tube is in a relaxed state, the elastomeric tube being stretched over the cylindrical shaft;

c. a compression seal at each end of the tube, each compression seal comprising a topographical feature on the shaft defining at least one circumferential edge at a change in radius of the shaft effective for concentrating stress in the elastomeric tube around said edge to provide liquid sealing action; and d. one or more secondary compression seals defined by topographical features adjacent at least one end of the shaft.

4. The roller claimed in claim 3, wherein the diameter of the shaft at the secondary seals is greater than the inside diameter of the elastomeric tube in a relaxed state.

5. The roller claimed in claim 4, wherein the topographical features defining the secondary compression seals are round bottomed grooves.

6. The roller claimed in claim 4, wherein the topographical features defining the secondary compression seals are v-shaped grooves.

7. The roller claimed in claim 4, wherein the topographical features defining the secondary compression seals are rectangular shaped grooves.

8. The roller claimed in claim 4, wherein the topographical features defining the secondary compression seals are flat topped ridges.

9. The roller claimed in claim 4, wherein the topographical features defining the secondary seals are v-shaped ridges.

* * * * *